US011270668B1

(12) United States Patent
Raynor et al.

(10) Patent No.: US 11,270,668 B1
(45) Date of Patent: Mar. 8, 2022

(54) SYSTEM AND METHOD FOR DETECTING SCREEN ORIENTATION OF A DEVICE

(71) Applicant: STMicroelectronics (Research & Development) Limited, Marlow (GB)

(72) Inventors: Jeffrey M. Raynor, Edinburgh (GB); Marek Munko, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 0 days.

(21) Appl. No.: 17/107,070

(22) Filed: Nov. 30, 2020

(51) Int. Cl.
  *G09G 5/32* (2006.01)
  *G06F 1/16* (2006.01)
  *G06T 7/70* (2017.01)

(52) U.S. Cl.
  CPC ............. *G09G 5/32* (2013.01); *G06F 1/1626* (2013.01); *G06T 7/70* (2017.01); *G06F 2200/1614* (2013.01); *G09G 2340/0492* (2013.01)

(58) Field of Classification Search
  CPC .............. G09G 5/32; G09G 2340/0492; G06F 1/1626; G06F 2200/1614; G06T 7/70; G06T 3/60
  See application file for complete search history.

(56) References Cited

U.S. PATENT DOCUMENTS

| 5,777,771 A | 7/1998 | Smith |
| 8,358,321 B1 | 1/2013 | Weidner |
| 2013/0120458 A1 | 5/2013 | Celebisoy et al. |
| 2014/0062860 A1 | 3/2014 | Lee et al. |
| 2016/0154088 A1* | 6/2016 | Holtman .................. F21S 8/04 382/106 |
| 2019/0318710 A1* | 10/2019 | Gurr .................... F16M 11/105 |
| 2020/0380935 A1* | 12/2020 | Ignaszewski ......... G06F 1/1622 |

OTHER PUBLICATIONS

Wikipedia, "Time-of-flight camera." https://en.wikipedia.org/wiki/Time-of-flight_camera, 9 pages, last revised Nov. 27, 2020.

* cited by examiner

*Primary Examiner* — Jeffery A Brier
(74) *Attorney, Agent, or Firm* — Slater Matsil, LLP

(57) ABSTRACT

A method for detecting an orientation of a screen of a device includes having a two-dimensional (2D) detector array affixed to the device in a fixed orientation relative to the screen, where the 2D detector array includes a sensing area with a plurality of pixels; imaging a scene including a user in a foreground and a background onto the 2D detector array; extracting an information of the scene for each of the plurality of pixels of the sensing area, the information being extracted from the 2D detector array by an image sensor; identifying an asymmetry in a pixelated image of the scene that includes the information of the scene for each of the plurality of pixels of the sensing area; and based on the asymmetry in the image of the scene, determining the orientation of the screen relative to the user.

20 Claims, 12 Drawing Sheets

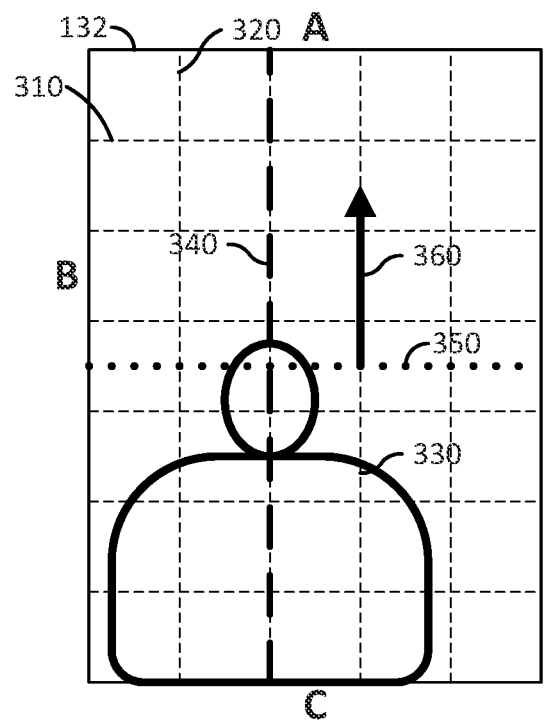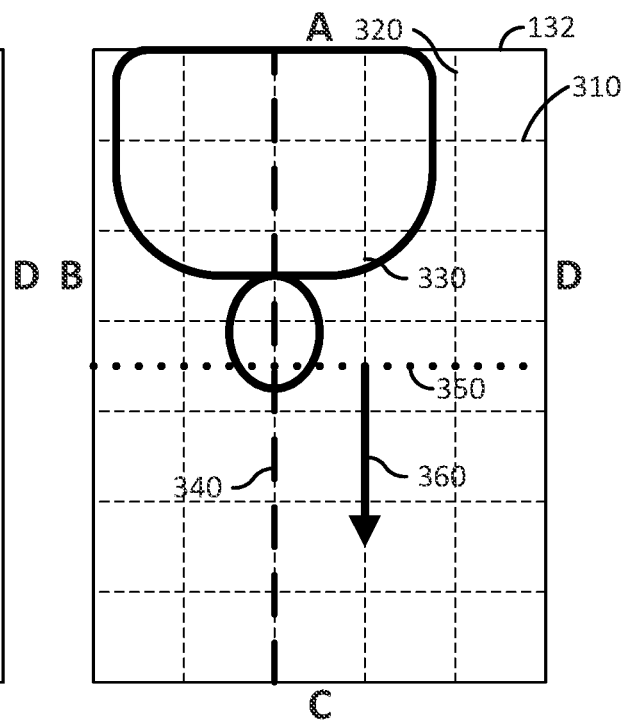
FIGURE 3A  FIGURE 3B
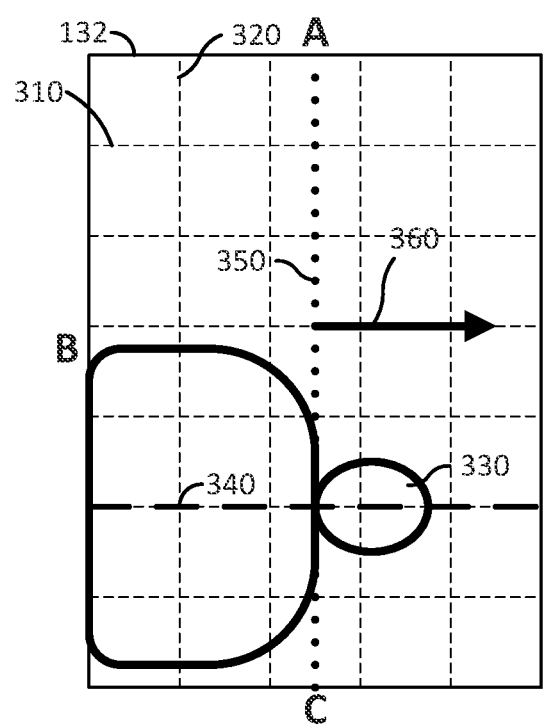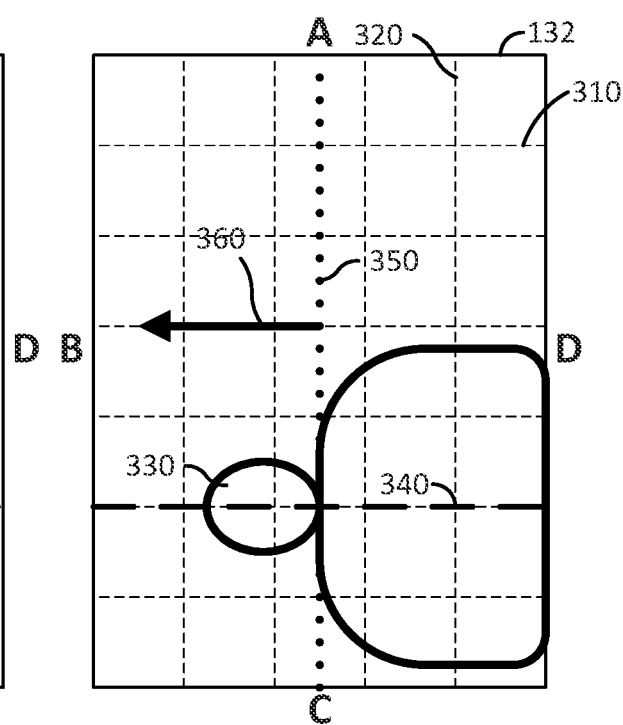
FIGURE 3C  FIGURE 3D

SYSTEM AND METHOD FOR DETECTING SCREEN ORIENTATION OF A DEVICE

TECHNICAL FIELD

The present invention relates generally to a system and method for controlling displays in mobile devices, and, in particular embodiments, to a system and method for detecting screen orientation of a device.

BACKGROUND

The availability of high circuit density integrated circuits (IC), in combination with advances in low-power circuit design and battery technology, has ushered in an era of handheld mobile electronic devices such as smart phones, tablet computers, e-book readers, and smart watches that perform a variety of functions. A smart phone, for example, may be equipped with a radio frequency (RF) transceiver, a digital camera, a global positioning system, application software, a processor, memory, and an operating system, performing functions such as, audio and video phone calls, internet access, navigation, wireless data transfer, and computation. The user interface is often a screen of an electronic display, typically a touchscreen surface serving both input and output functions. Generally, the screen is shaped like a rectangle with edges having unequal length. For convenience of use, the orientation of content displayed on the screen is designed to be automatically adjustable by the mobile device. For example, user experience is enhanced if text displayed in landscape mode is automatically rotated by the device when the screen is held in a portrait view of the user. Some smart phones and tablets use gravity sensors to detect which edges of the screen are vertical, thereby inferring a screen orientation relative to the user by assuming the user to be in an upright posture. A gravity based auto-orientation scheme has to rely on this assumption; costly face recognition methods are possible to remove such constraints. Further innovations are needed to achieve rapid and accurate detection of user orientation for improved interfacing with a mobile device via a display screen at a low cost.

SUMMARY

A method for detecting an orientation of a screen of a device includes having a two-dimensional (2D) detector array affixed to the device in a fixed orientation relative to the screen, where the 2D detector array includes a sensing area with a plurality of pixels; imaging a scene including a user in a foreground and a background onto the 2D detector array; extracting an information of the scene for each of the plurality of pixels of the sensing area, the information being extracted from the 2D detector array by an image sensor; identifying an asymmetry in a pixelated image of the scene that includes the information of the scene for each of the plurality of pixels of the sensing area; and based on the asymmetry in the image of the scene, determining the orientation of the screen relative to the user.

A method for detecting an orientation of a screen of a device, the method includes: having a two-dimensional (2D) detector array affixed to the device in a fixed orientation relative to the screen that includes a sensing area with a plurality of pixels; imaging a scene onto the 2D detector array, the scene including a user in a foreground and a background; acquiring a pixelated depth image of the scene, the pixelated depth image including a depth of the scene for each of the plurality of pixels of the sensing area, the depth being extracted from the 2D detector array by a depth image sensor; based on a reflection symmetry of the pixelated depth image of the scene across a plurality of horizontal lines and a plurality of vertical lines spanning the sensing area, finding a first axis of reflection as the line across which the pixelated depth image of the scene is substantially symmetric; defining a second axis perpendicular to the first axis, the second axis passing through a central point of the sensing area; based on an asymmetry in the image of the scene for reflection across the second axis, determining the orientation of the image of the user along the first axis of reflection; and based on the orientation of the image of the user, determining the orientation of the screen relative to the user.

A mobile device including: a screen; a camera including: an illuminator configured to illuminate a scene in its field of view; an imaging system configured to project an optical image of the scene onto a two-dimensional (2D) detector array affixed to the device in a fixed orientation relative to the screen, the 2D detector array including a sensing area with a plurality of pixels; and an image sensor configured to extract a pixelated image of the scene from the 2D detector array, the pixelated image including an information of the scene for each of the plurality of pixels of the sensing area; a processor; a memory; and a program including an instruction stored in the memory, where the program is coded with an instruction which, when executed by the processor causes the processor to: identify an asymmetry of a pixelated image of the scene, the pixelated image including the information of the scene for each of the plurality of pixels of the sensing area; and based on the asymmetry of the image of the scene, determine the orientation of the screen relative to a user.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3A-3D illustrate an example of a method for detecting an orientation of an image of a user relative to a screen, in accordance with an embodiment;

DETAILED DESCRIPTION OF ILLUSTRATIVE EMBODIMENTS

Figure 1:
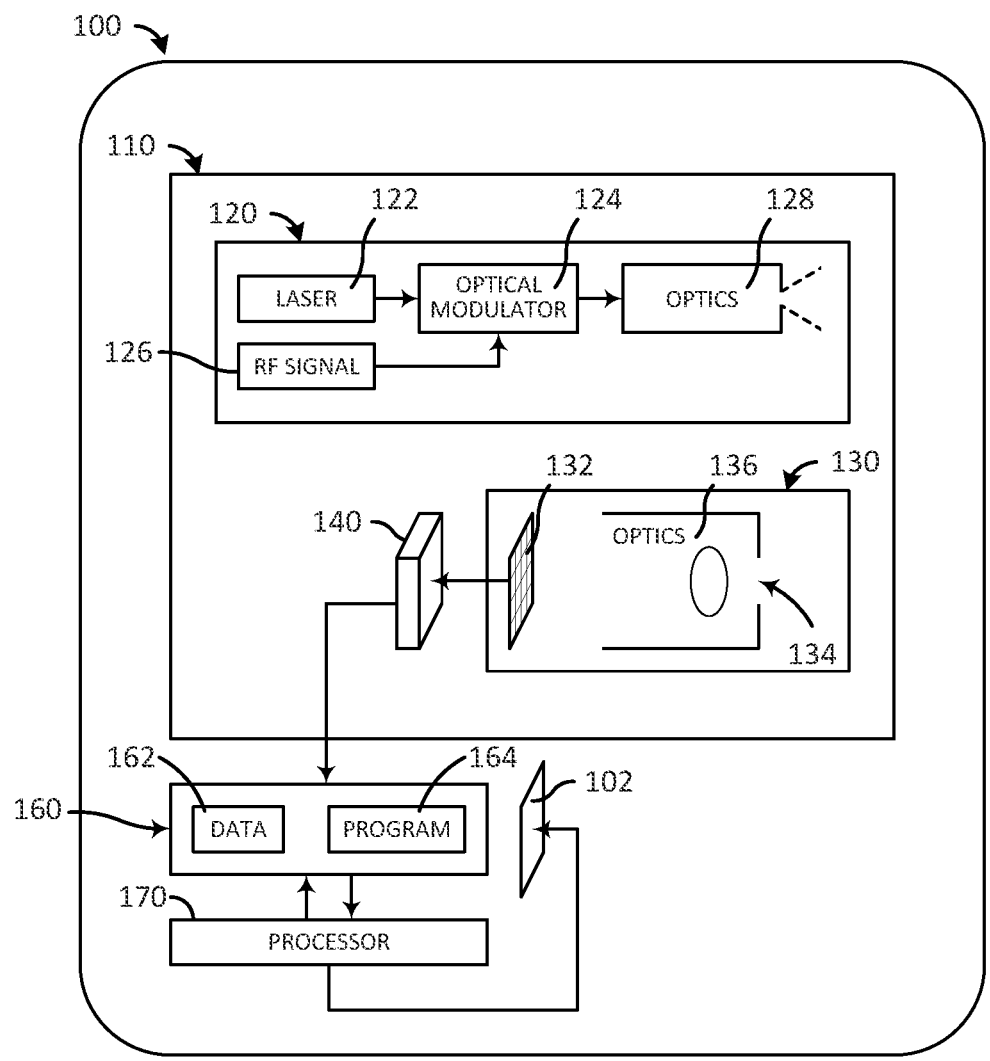
FIG. 1 illustrates a schematic of an example of a device comprising a system for detecting a screen orientation of a device relative to a user, in accordance with an embodiment.

This disclosure describes embodiments of systems and methods using which an electronic device may automatically detect an orientation of a display screen of the device relative to a user viewing the displayed content. Detecting the orientation of the user relative to the screen is useful for adjusting the orientation in which content is displayed to facilitate viewing when, for example, a position of the handheld mobile device is rotated by the user. Generally, the screen having four major edges is held relative to the user in one of four directions, for example, head-to-foot, foot-to-head, left-to-right, or right-to-left. The direction, if detected, may be used by the device to automatically rotate the displayed content in an orientation relative to the screen that is convenient for viewing by the user. In commonly encountered use conditions, the content has to be rotated to one of four distinct orientations, depending on the direction in which the device is held with respect to the user. For instance, the content may have to be displayed in portrait-up, portrait-down, landscape-left, or landscape-right orientation when the screen is oriented head-to-foot, foot-to-head, left-to-right, or right-to-left, respectively.

The screen orientation detection systems in this disclosure are image-based detection schemes. An example embodiment of an image-based detection system for a device having a display screen, such as a mobile phone, is first described with reference to FIG. 1. The device includes a camera which projects an optical image of a scene comprising a user in its field of view onto a two-dimensional (2D) detector array of the camera in a sensing area affixed to the device. A pixelated 2D image may be acquired from the detectors by an image sensor of the camera and processed by the device to detect one of the four directions in which a 2D image of the user may be orientated relative to the sensing area of the camera affixed to the device in a fixed orientation. Both the sensing area and the screen being rigidly attached to the device, one may infer the orientation of the screen relative to the user from the orientation of the image of the user relative to the sensing area.

The example methods for determining the orientation of the image of the user relative to the sensing area are outlined in flow diagrams in FIGS. 2, 8, 11A, and 11B. As explained in detail further below, in some embodiments, a reasonable assumption that the user is located in a foreground of the scene may be made. For a mobile device, the foreground may be considered to be a region in the field of view that falls within an arm's length, or about one meter, from the device. It is further assumed implicitly that the scene, comprising a background and the user, has asymmetry by which four orientations can be distinguished in an image of the scene, the orientations being relative to the sensing area onto which the image is projected. Such asymmetry would be present in the image of a scene that is expected to be dominated by an image of the user in the foreground. FIGS. 3A-3D illustrate example images of a scene having an image of the user in four different orientations relative to the sensing area; starting from an upright orientation (up), referred to as the 0° rotation, to the rotated images, rotated clockwise by 90° (right), 180° (down), and 270° (left). Each image, shown in FIGS. 3A-3D, is distinctly different, thereby illustrating a rotational asymmetry.

Along with FIGS. 3A-3D, FIGS. 9, and 10A-10D are used to explain that, based on asymmetry in the images acquired by the camera, a processor in the device may be programmed to identify an orientation for an image of the user as one of four perpendicular directions such as up, down, right, and left. FIGS. 4A-4B, 5A-5B, 6A-6B, 7A-7B illustrate that the up, right, down, and left directions, respectively, of the image of the user relative to the sensing area are reflective of the respective head-to-foot, left-to-right, foot-to-head, and right-to-left directions of the screen relative to the user.

Figure 12:
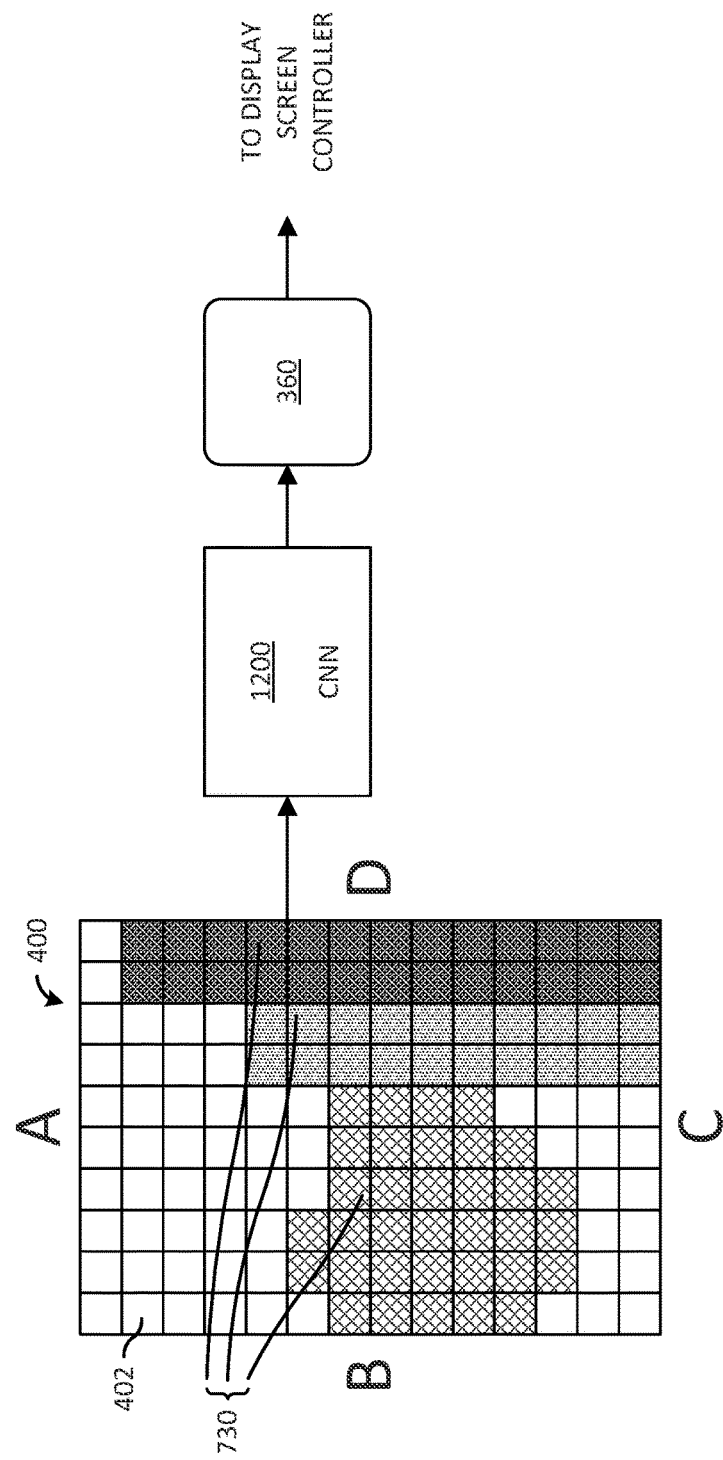
FIG. 12 illustrates a block diagram of an example of a system using a convolutional neural network (CNN) for detecting a screen orientation of a device relative to a user, in accordance with an embodiment.

FIG. 12 illustrates that the methods for processing the information acquired as 2D images may be refined further by machine learning techniques using, for example, a convolutional neural network (CNN).

One advantage of an image-based system is that it extracts information of the orientation of the screen directly with reference to the direction in which the user is oriented, without using another independent reference direction, for example, the direction of the force of gravity in a gravity-based orientation detection system. Furthermore, the inventors have verified from a number of test examples that a low-resolution image may suffice for the image processing techniques used in the methods disclosed in this document to correctly determine the orientation of the screen relative to the user. For example, pixelated depth images having about 23 to about 2100 pixels may be acquired and processed to determine the screen orientation relative to the user with a high probability of success of about 95% to about 99.99%. This provides the advantage of reducing the cost of the detection system by allowing the use of a relatively cheap low-resolution camera. The ability to use a low resolution pixel array dramatically improves the power requirement of this method.

FIG. 1 is a schematic illustrating an example mobile device 100 having a fixed display screen 102 and a system for detecting an orientation of the screen relative to a user who may be holding the device 100 to view the displayed content, such as text displayed on the screen 102. The detection system comprises a camera 110, a memory 160, and a processor 170.

The three main components of the camera no are an illuminator 120, an imaging system 130, and an image sensor 140. The illuminator 120 generates an optical signal, for example, an infrared signal that is used to illuminate a scene in a field of view of the camera no. The optical signal gets reflected off the surfaces of various objects in the scene, which includes the user in the foreground. The imaging system 130 receives the reflected signals and projects an optical image of the scene onto a two-dimensional (2D) detector array 132 that is affixed to the device 100 in the focal plane of the optics 136 of the imaging system 130. Embodiments of the present application may use a low resolution 2D detector array, for example, a 5×5 pixel array to 128×128 pixel array.

The image sensor 140 comprises electronic circuitry that acquires a 2D pixelated image from the output signals it receives from the detector array 132. The image sensor 140 may transmit the acquired information to the memory 160 for storage and subsequent processing, or directly to the processor 170.

In general, the image acquisition may be based on various imaging schemes but, for specificity, the camera no of the example detection system illustrated in FIG. 1 may be a light detection and ranging system (LIDAR), for example, a scannerless time-of-flight (TOF) camera. The output of a range detecting camera (e.g., a LIDAR) is a depth image of the scene. In the time-of-flight technique the image sensor 140 extracts the depth of an object in the scene by detecting the time taken by light from the illuminator 120 to strike a surface of the object, be reflected back to the camera, where the reflected light may be detected by a detector in the 2D detector array 132.

The user, being in the foreground of the scene, would be imaged as an object having small depth values relative to objects in the background. Since an object in the foreground may be identified by its short distance from the camera, it may be convenient to acquire and process a depth image to detect the shape and orientation of the user relative to the sensing area.

The objective of a screen orientation detection system is to simply select between one of four orientations of the screen relative to the user. The methods used in the embodiments described herein may not need a high spatial resolution image of the scene to achieve that objective. A low-resolution image is not only cheaper to acquire but also faster to process. The a priori knowledge that the user is in the proximity of the camera is also advantageous since it eliminates the need of a high power light source to illuminate the background or a mechanical scanner to raster scan the field of view with a high intensity collimated beam from a lower power light source. Using a low power light source provides the dual benefit of lowering cost and reducing power consumption, both of which are important for battery-powered consumer products. Also, being scannerless speeds up data acquisition by illuminating the entire field of view simultaneously with a divergent beam.

There are various methods by which a TOF camera may detect the round trip time taken for light emitted from the illuminator 120 to strike a surface and return to the detector array 132. A direct TOF method illuminates the scene with a laser pulse and simultaneously provides a trigger signal to the image sensor. The arrival time of the detected reflected light is compared with the trigger signal to obtain the round trip time taken by the pulse. While this method is extremely fast because the image of the scene is acquired in a single laser pulse, for the same reason, this method requires more expensive high performance electronics and a relatively powerful laser to get a reasonable signal-to-noise ratio (SNR). Such high performance may not be needed for this application.

The camera 110 of the example detection system illustrated in FIG. 1 uses an indirect TOF method in which the scene is illuminated by a continuous wave (CW) or a periodic pulse train of coherent light from a relatively low power laser 122 of the illuminator 120. It is common practice to use unobtrusive infrared light to illuminate the scene. The output from the laser 122 is provided to an optical modulator 124, where a radio frequency (RF) signal from an RF source 126 is used to generate an RF-modulated optical signal. The signal from the optical modulator 124 passes through an optics module 128 comprising a diverging lens that forms a wide divergent beam to illuminate the full field of view of the camera. A reference signal synchronized to the outgoing signal from the illuminator 120 may be transmitted to the image sensor 140.

In the camera no in FIG. 1, light reflected from objects in the illuminated scene is received through an aperture 134 of the imaging system 130. The incoming light passes through an optics module 136 that uses a converging lens to project an optical image of the scene onto the 2D detector array 132 in a sensing area in the focal plane of the imaging system 130. In order to increase the SNR, a bandpass filter in the optics module 136 may be used to select the optical signal used by the camera and filter out extraneous radiation.

Each detector of the 2D detector array 132 is typically a solid-state diode (e.g., a silicon p-n junction diode). The diode photodetector may be operated at a low reverse-bias (e.g., 1 V to 5 V), in which case the photodetector is referred to simply as photodiode. In another technique, also using a p-n junction diode, a high reverse bias in excess of the diode's reverse breakdown voltage (e.g., 12 V to 30 V) is applied; in this case the photodetector is referred to as a single-photon avalanche diode (SPAD).

The photodiode reverse current is roughly proportional to the light intensity and may be integrated using electronic circuitry of the image sensor 140 over a period of microseconds to about a millisecond, generating a signal with a robust SNR. With the reference signal and phase detection circuitry, the image sensor 140 may detect the phase shift between the modulating RF signal in the reference waveform and the reflected signal received at the detector. The phase difference may be used by the TOF image sensor 140 to obtain the depth information for the respective pixel.

The SPAD-based TOF depth imaging technique may use an outgoing optical signal comprising a train of laser pulses generated in the illuminator 120 with the RF signal source 126 and the optical modulator 124. The optical signals reflected from objects in the illuminated scene may be projected onto the 2D detector array 132 comprising a 2D array of SPAD photodetectors, sometimes referred to as a SPAD photomultiplier. The operating principle of a SPAD, as explained below, makes it suitable for detecting the leading edges of optical pulses. The time-delay between the pulse edges of the outgoing signal and those of the incoming signal may be obtained by the TOF image sensor 140 by comparing the detected signal with the reference signal provided by the illuminator 120. The TOF image sensor 140 may use the time-delay information for each detector to determine the depth information for the respective pixel.

In its quiescent or dark state, the SPAD photodetector is biased at such a high electric field that even a single photon absorbed in the high field region, resulting in one electron-hole pair generation can trigger an avalanche of electron-hole pairs generated by impact ionization in the diode. This makes the SPAD detector suitable for detecting the leading edge of an optical pulse. The avalanche process is a self-sustaining chain of impact ionization events that creates a rapid increase in current, often in about tens of picoseconds. The SPAD is used in conjunction with a quenching resistor that prevents a high reverse current to flow for a long enough time to irreversibly damage the device. The quenching circuit forces the current to subside and quickly resets the SPAD to its quiescent state at the end of the optical pulse with a time constant of about 1 ns to about 30 ns. The high reverse bias regime is sometimes called the Geiger zone in analogy between the beep of a Geiger counter detecting the arrival of an ionizing particle and the sharp spike in current produced by a SPAD detecting an ionizing photon.

As mentioned above, with both the 2D detector array 132 and the screen 102 rigidly attached to the same device 100, identifying the orientation of the image of the user in relation to the sensing area is equivalent to determining the orientation of the screen 102 relative to the user in the field of view of the camera no. In the example detection system in FIG. 1, the processor 170 has access to the 2D pixelated depth image of the scene acquired by the image sensor 140 and stored in a section of memory 160 indicated as data 162 (or routed directly to the processor for in real time processing). Also stored in memory 160 is program 164. Program 164 comprises a coded instruction implementing an algorithm for the processor 170 to determine the orientation of the screen 102 relative to the user.

Figure 2:
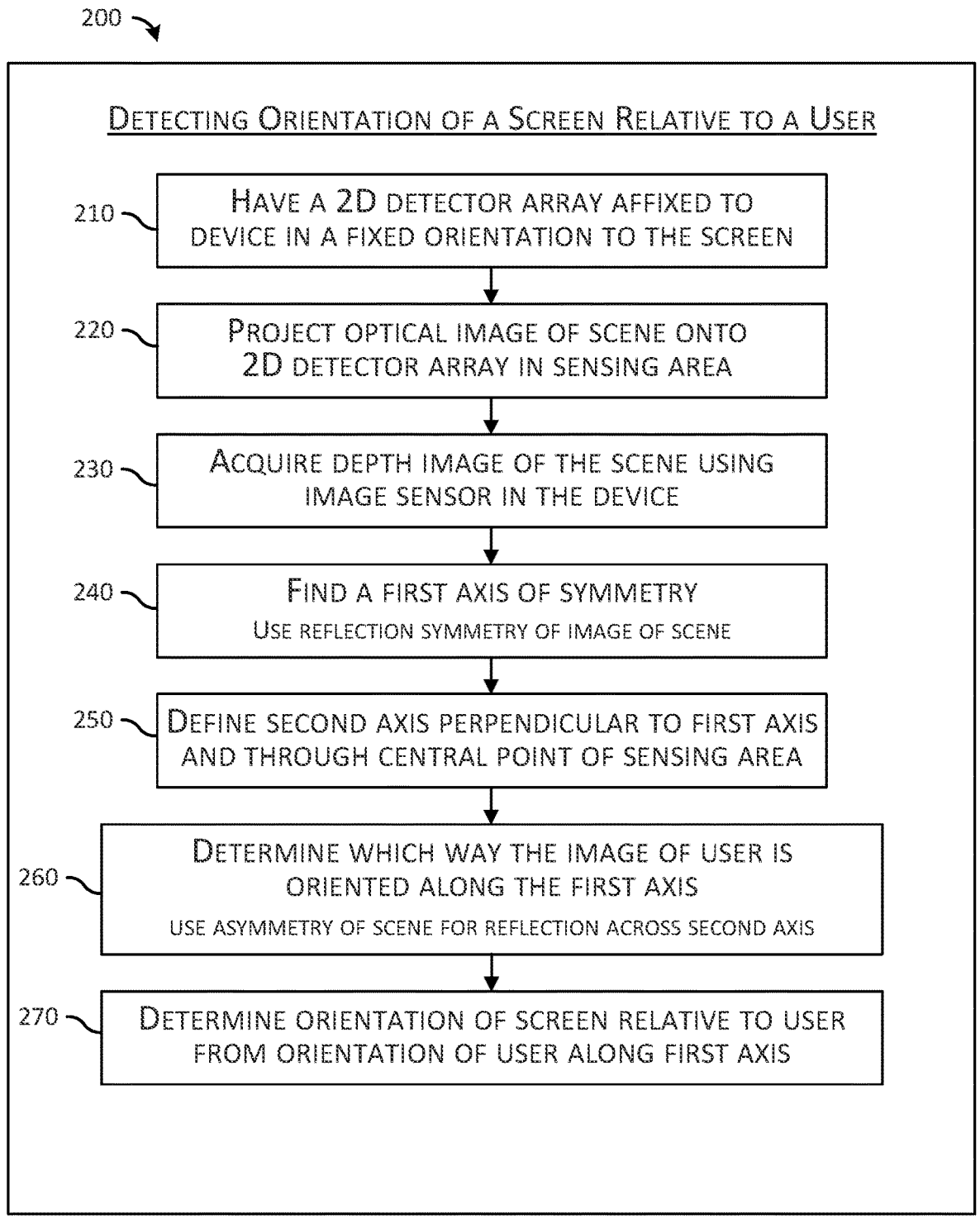
FIG. 2 illustrates a flow diagram for a method for detecting a screen orientation of a device relative to a user, in accordance with an embodiment.

The flow diagram in FIG. 2 along with the images illustrated in FIGS. 3A-3D describes an example method 200 for detecting a screen orientation of a device relative to a user. In the first part of the method 200, outlined in blocks 210, 220, and 230, a depth image of the scene comprising the user is acquired. The remaining part of the method 200, outlined in blocks 240, 250, 260, and 270, comprises executing the example algorithm coded in program 164 (see FIG. 1). By executing the instruction in program 164, the processor 170 may identify the orientation of the image of the user relative to the sensing area, thereby determining the orientation of the screen 102 relative to the user.

The method 200 comprises having, for example, the 2D detector array 132 of the camera no in FIG. 1 affixed to the device 100 in a fixed orientation to the display screen 102, as indicated in block 210. Blocks 220 and 230 indicate that the scene comprising the user in the foreground is imaged using the camera no. An optical image of the scene is formed first. As explained above with reference to FIG. 1, first an outgoing divergent beam, for example, an RF-modulated infrared beam, reflects off objects in the scene, which includes the user. The reflected light, incoming through the aperture 134 of the imaging system 130, passes through a bandpass filter designed to select the frequencies in the outgoing optical signal, and is projected onto the 2D detector array 132 in the sensing area (block 220). The signals from the 2D detector array 132 are used by the image sensor 140 to acquire a pixelated depth image of the scene (block 230). The image of the user may be identified as the pixels having a low depth value since it is known a priori that the user is within a predefined maximum depth. Some of the pixels receiving light reflected off objects deep in the background may not have valid data because the light signal may be too faint. These pixels may be assigned a pre-determined large depth in the image acquired and stored by the image sensor 140.

The example algorithm outlined in blocks 240, 250, 260, and 270 of FIG. 2 is explained with reference to FIGS. 3A-3D. The algorithm is used in method 200 to identify the orientation of the image of the user relative to the sensing area based on symmetry and asymmetry in the image of the scene, thereby determining the orientation of the screen 102 relative to the user.

As illustrated in FIGS. 3A-3D, the pixelated sensing area is approximated by a rectangle with four edges, A, B, C, and D. Each pixel of the sensing area contains one detector of the 2D detector array 132. A rough imitation of an image of the user 330, shown in FIGS. 3A-3D, is an oval-shaped head disposed on one edge of a rectangle-like torso. Four different orientations of the image of the user 330 relative to a fixed sensing area (the rectangle with edges A, B, C, and D) are referred to as up, down, right, and left, where each orientation is indicated by the direction of an arrow 360. It is noted that, in the example embodiments described in this disclosure, the methods identify one of these four directions as the orientation of the image of the user relative to the sensing area. It is further noted that all the four directions are parallel to the edges of the rectangle representing the 2D detector array 132 comprising the sensing area. However, it is understood that other methods, similar to those described in this disclosure, may accommodate a different number of orientations and a different shape of the sensing area.

The left and right sides of a human body are roughly mirror images of each other. Accordingly, the image of the user 330 is expected to possess a similar symmetry for reflection across an axis, referred to as a first axis of symmetry 340, indicated by a dashed line in FIGS. 3A-3D. As illustrated in FIGS. 3A-3D, the direction of the arrow 360, which represents the orientation of the user 330, is parallel to the first axis of symmetry 340. In executing block 240 of the method 200, the processor 170 finds the first axis of symmetry as it processes the image of the scene in accordance with the coded instruction in program 164. In the up and down orientations, illustrated in FIGS. 3A and 3B, respectively, the first axis of symmetry 340 is vertical and, in the right and left orientations, illustrated in FIGS. 3C and 3D, respectively, the first axis of symmetry 340 is horizontal. It is thus understood that the pertinent information to be obtained by the processor 170 in executing block 240 is identifying whether the first axis of symmetry 340 is horizontal or vertical.

Several methods are conceivable for identifying whether the first axis of symmetry 340 is horizontal or vertical. One way to achieve this goal may be to calculate a metric for reflection symmetry of the image of the scene across a plurality of horizontal lines 310 and a plurality of vertical lines 320 spanning the sensing area. If the highest metric for reflection symmetry across a line is found to be one of the vertical lines 320 then the right and left orientations of the image of the user 330 relative to the sensing area may be eliminated as a possibility for the image being processed; otherwise, the up and down orientations may be eliminated.

After determining whether the first axis of symmetry 340 is horizontal or vertical, the processor 170 has to determine a direction along the first axis of symmetry 340 as the direction of the arrow 360, which represents the orientation of the image of the user 330 relative to the sensing area. In other words, if the first axis of symmetry is found to be vertical, the processor still has to select between up and own. Likewise, processor 170 has to distinguish between right and left in the event that the first axis of symmetry 340 is horizontal. The distinction between the two possible directions along the first axis of symmetry 340 is based on a respective asymmetry in the image of the scene. In order to select between the two possible directions along the first axis of symmetry 340 as the direction of the arrow 360, a second axis 350 is defined in the example algorithm used in method 200. The second axis 350 is defined to be the line perpendicular to the first axis and passing through a central point of the sensing area, as indicated in block 250 in FIG. 2 and by a dotted line 350 in FIGS. 3A-3D. The asymmetry between the top (head) and bottom (torso) sides of a human body is reflected in the image of the user 330. This asymmetry would be carried over in the image of the user 330 and; hence the image of the scene would be asymmetric for reflection across the second axis 350. An attribute of the image of the user may thus be used to detect the direction of the asymmetry, as indicated in block 260 in FIG. 2. While there are conceivably various possibilities, the attribute of depth has been used in the algorithm implemented in method 200. For example, consider the image in FIG. 3A (the up orientation) and the image in FIG. 3B (the down orientation). The two images are partitioned into an upper (closer to edge A) and a lower half (closer to edge C) by the second axis 350. Up and down orientations may be differentiated by determining which of the two halves of the image have a higher count of pixels that may be included in the foreground of the image of the scene, where a pixel may be designated to be in the foreground or in the background depending on its depth value being greater than or less than a preset value, respectively. As illustrated in FIGS. 3A and 3B, the image of the scene with a higher count in the lower half may be identified as having the image of the user 330 in an up orientation relative to the sensing area, and vice versa.

The attribute of depth may also be advantageously used to identify the image of the user 330 based on the a priori knowledge that the user is within a predefined maximum depth, as mentioned above. This simplifies the process used above for finding the first axis of symmetry 340. In the method described above, the first axis of symmetry 340 was found by calculating a metric for reflection symmetry of the image of the scene across each of the plurality of horizontal lines 310 and vertical lines 320 spanning the sensing area and selecting the line for which the metric is highest. Instead, because the image of the user 330 has been identified, the first axis of symmetry 340 may be selected from two central axes of the image of the user comprising one horizontal line and one vertical line passing through a central point of the image of the user 330. The metric for reflection symmetry of the image of the user 330 may be calculated for reflection across the two central axes and the axis with the higher metric may be defined as the first axis of symmetry 340 and the second axis may be defined as the central axis perpendicular to the first axis of symmetry 340. It is noted that the second axis defined using this method may be a different line parallel to the second axis 350 defined using the method described above and illustrated in FIGS. 3A-3D. However, this would not alter the identification of the orientation of the image of the user 330 relative to the sensing area. As in the method described above the direction of the orientation of the image of the user 330 relative to the sensing area (the direction of the arrow 360) may be based on the asymmetry of the image except, in this method, the identified image of the user 330 is used instead of the image of the scene.

FIGS. 4A-4B, 5A-5B, 6A-6B, 7A-7B illustrate that the up, right, down, and left directions, respectively, of the images of a user relative to the sensing area 400 are reflective of the respective head-to-foot, left-to-right, foot-to-head, and right-to-left directions of a device 410 relative to a user 422 represented by a stick figure in the foreground of a scene 420 in a field of view 414 of a camera 412 in the device 410. FIGS. 4A, 5A, 6A, and 7A, show a pixelated sensing area 400 indicated by a rectangle having four edges A, B, C, and D. The 2D detector array 132 in the sensing area 400 is attached rigidly to the device 410, shown in FIGS. 4B, 5B, 6B, and 7B to be shaped like a rectangle. As explained above, being rigidly attached to the device 410 keeps the sensing area 400 in a fixed orientation relative to the device 410. In order to indicate the respective edges of the sensing area 400 and the edges of the device 410 to which the sensing area is attached, the respective edges of the two rectangles are marked A, B, C, and D. The pixelated sensing area 400 in FIGS. 4A, 5A, 6A, and 7A comprise a rectangular array of pixels 402.

Rough schematics of depth images 430, 530, 630, and 730 of the scene 420 comprising the depth image of the user 422 in the foreground of the scene 420 is shown overlaid on the sensing area 400 in FIGS. 4A, 5A, 6A, and 7A, respectively. In these example depth images, the different patterns of the pixels 402 indicate different values of depth. The solid white pixels represent pixels having a high value of depth (the background of the scene 420) and the patterned pixels have values which are in the proximity of the device (foreground of the scene 420). The foreground of the scene 420 being dominated by the user 422, the patterned pixels in the depth images 430, 530, 630, and 730 represent the depth images of the user 422 in four different orientations relative to the sensing area 400.

Figure 4B:
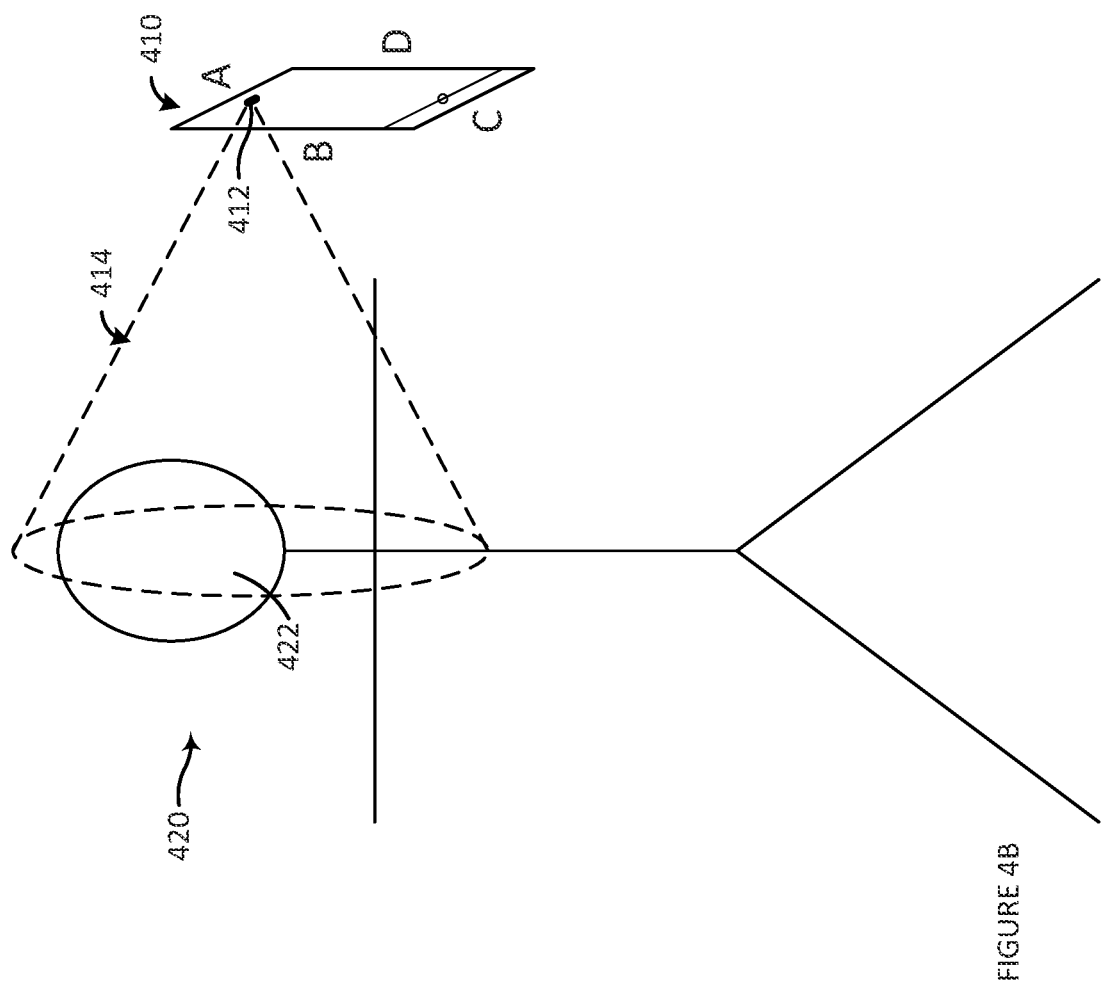
FIGS. 4A-4B illustrate an example of a pixelated image of a scene in a sensing area for a first orientation of the screen relative to the user, in accordance with an embodiment.
Figure 4A:
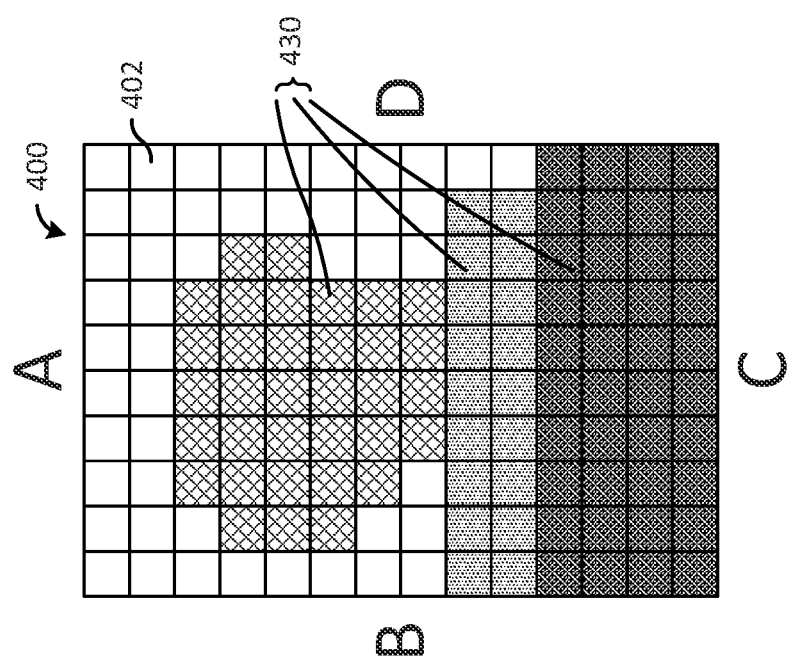
Figure 5B:
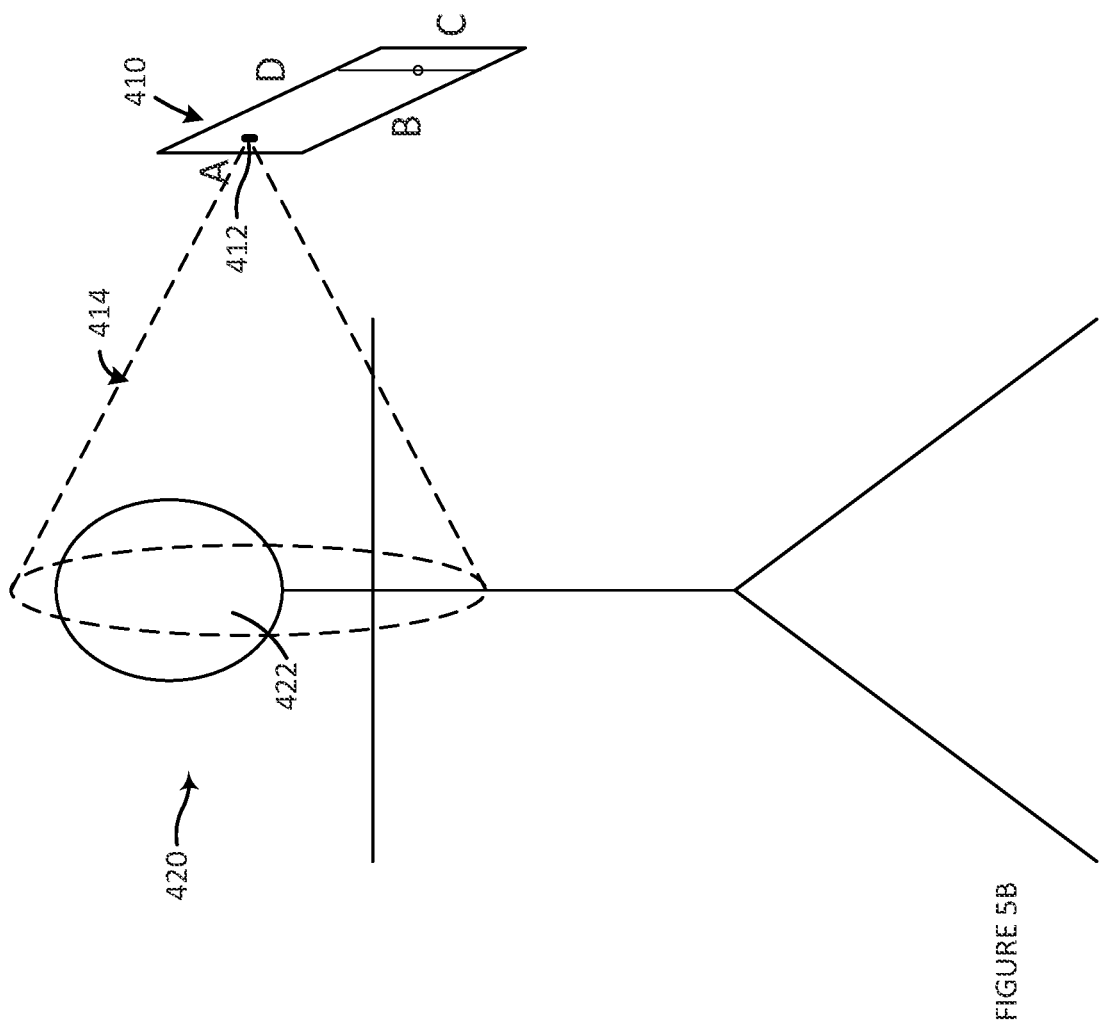
FIGS. 5A-5B illustrate an example of a pixelated image of a scene in a sensing area for a second orientation of the screen relative to the user, in accordance with an embodiment.
Figure 5A:
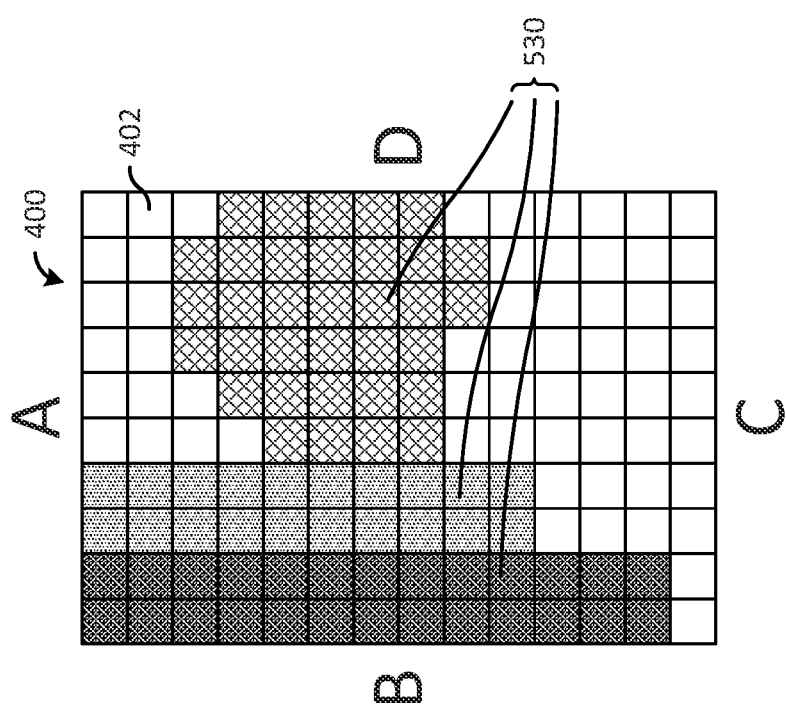
Figure 6B:
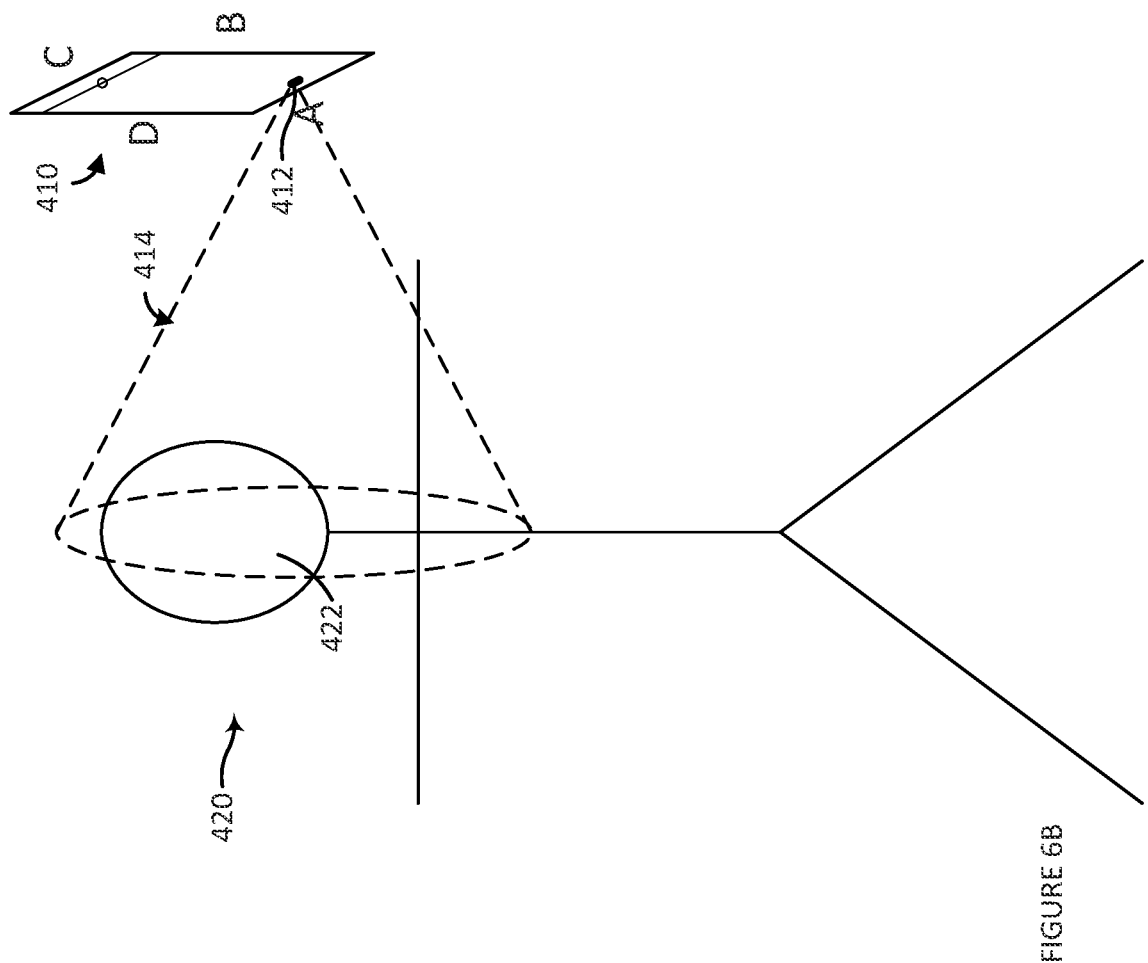
FIGS. 6A-6B illustrate an example of a pixelated image of a scene in a sensing area for a third orientation of the screen relative to the user, in accordance with an embodiment.
Figure 6A:
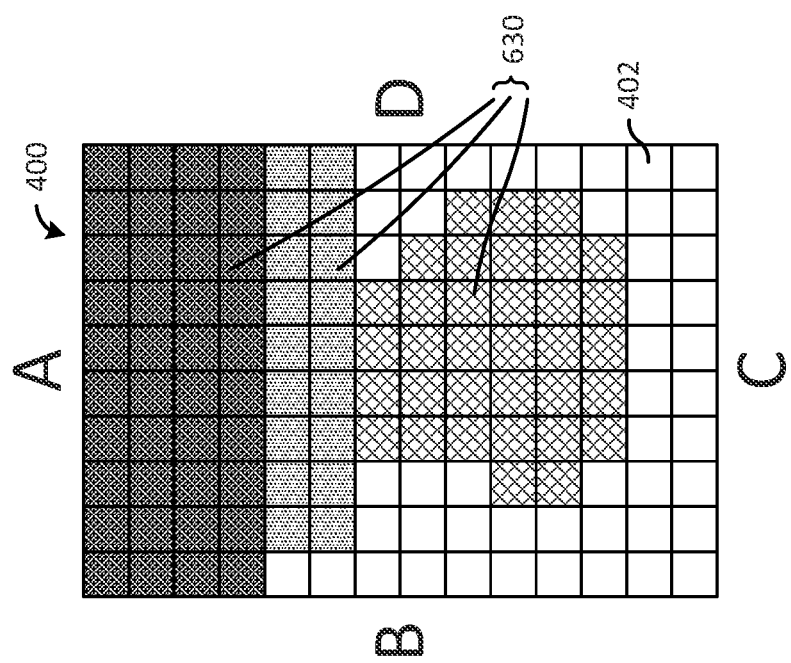
Figure 7B:
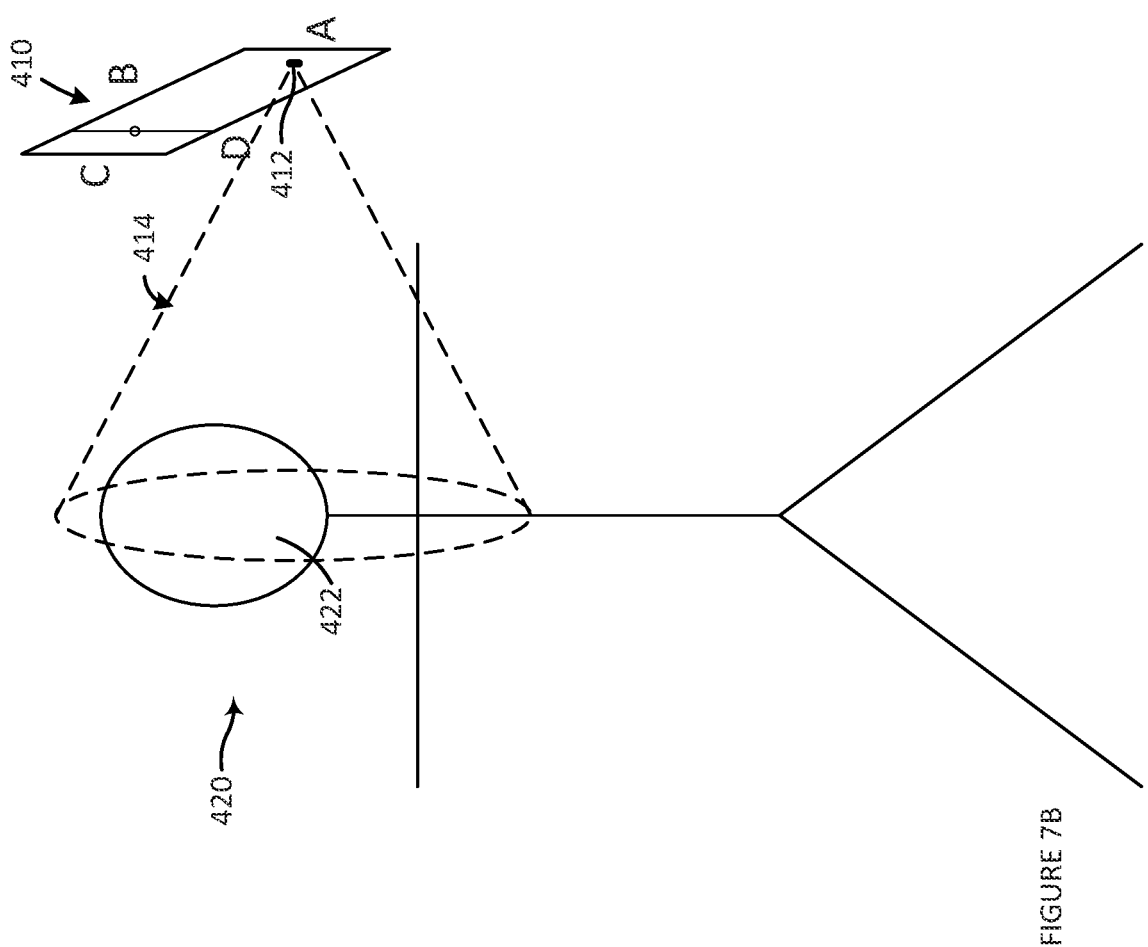
FIGS. 7A-7B illustrate an example of a pixelated image of a scene in a sensing area for a fourth orientation of the screen relative to the user, in accordance with an embodiment.
Figure 7A:
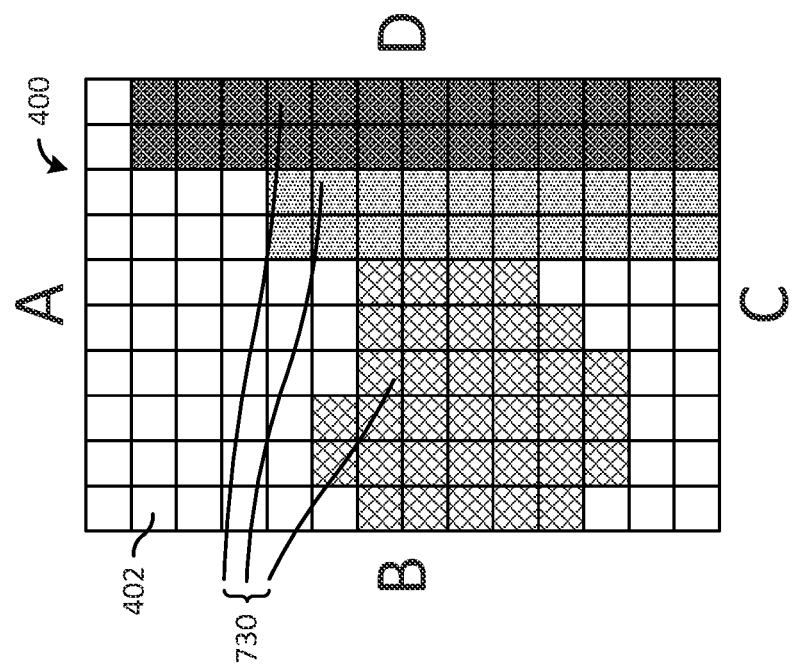

FIGS. 4A and 4B illustrate the depth image 430 in the up orientation. The respective orientation of the device 410 relative to the user 422 is a head-to-foot orientation. In FIG. 5B, the device 410 has been rotated counterclockwise by 90°. The camera 412 (which includes the sensing area 400) and the display screen of the device 410 get rotated along with the device 410 to a left-to-right orientation with respect to the user 422 in the field of view 414 of the camera 412. Accordingly, the depth image 530 of the user 422 (the image of the foreground of the scene 420) appears in the right orientation. Similarly, FIGS. 6A and 6B illustrate that the foot-to-head orientation of the device 410 relative to the user 422 orients the depth image 630 to the down orientation, and FIGS. 7A and 7B illustrate that the right-to-left orientation of the device 410 relative to the user 422 orients the depth image 730 to the left orientation in the sensing area 400.

Figure 8:
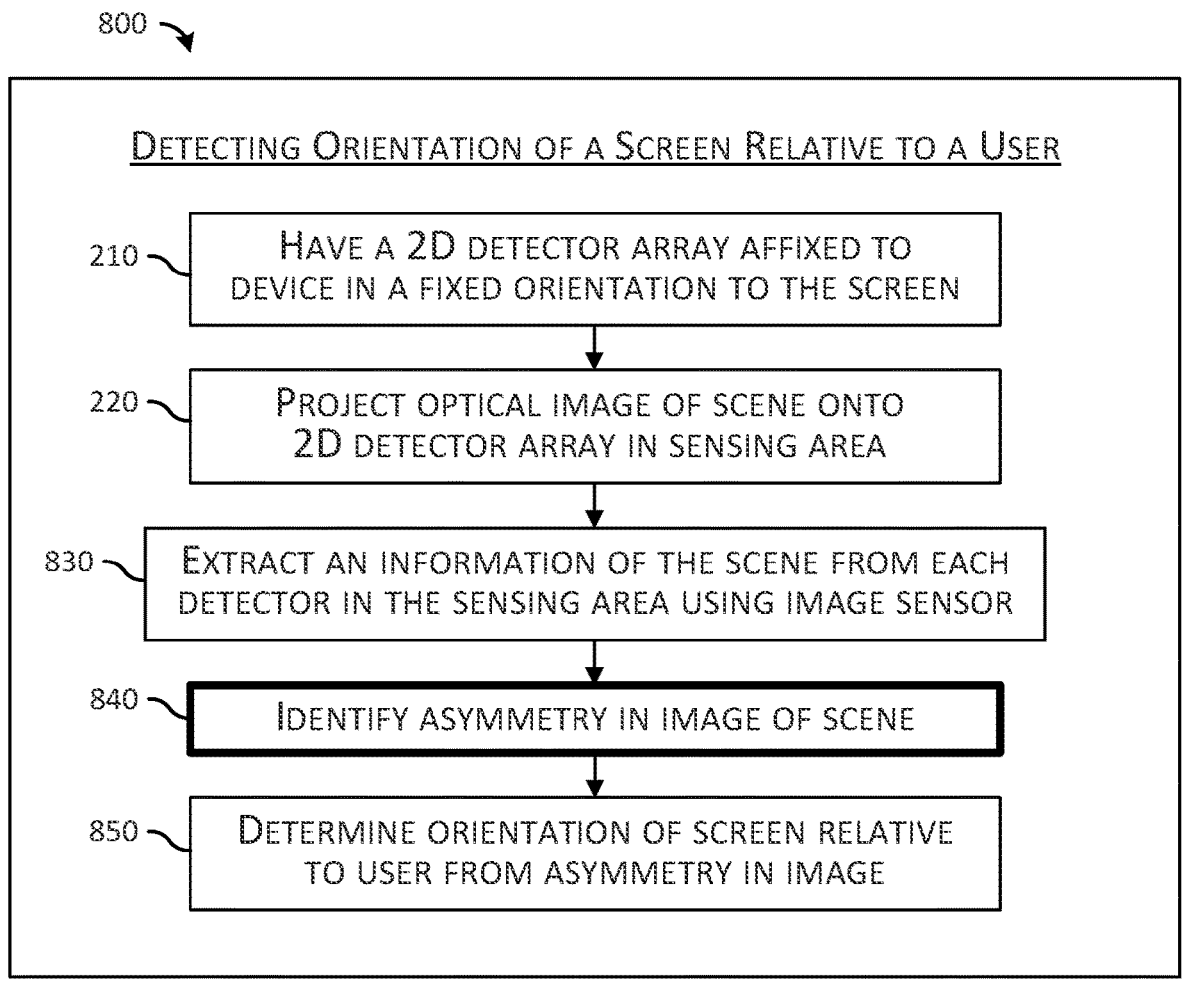
FIG. 8 illustrates a flow diagram for a method for detecting a screen orientation of a device relative to a user, in accordance with another embodiment.

FIG. 8 is a flow diagram illustrating an example method 800 for detecting a screen orientation of a device relative to a user. Similar to method 200, method 800 comprises having the 2D detector array 132 in the sensing area 400 attached rigidly to the device 410, as indicated in block 210, and projecting an optical image of the scene 420 onto the 2D detector array 132 in the sensing area 400, as indicated in block 220. As indicated in block 830, the optical signals incident on the detectors are used by the image sensor 140 to extract some information of the scene (e.g., depth information) to acquire an image of the scene 420 comprising an image of the user 422.

The acquired image of the scene may then be processed by the processor 170. However, unlike method 200, method 800 does not use reflection symmetry across an axis of reflection in the image. As indicated in block 840, the processor identifies asymmetry in the image of the scene and, based on a directional identity of the asymmetry, identifies the orientation of the image relative to the sensing area 400. The method by which the asymmetry may be identified is explained further below with reference to FIGS. 9, 10A-10D, and the flow diagrams in FIGS. 11A-11B, as highlighted by the bold outline used for block 840. As explained above, the orientation of the image relative to the sensing area 400 reveals the orientation of the display screen of the device 410, as indicated in block 850.

Figure 9:
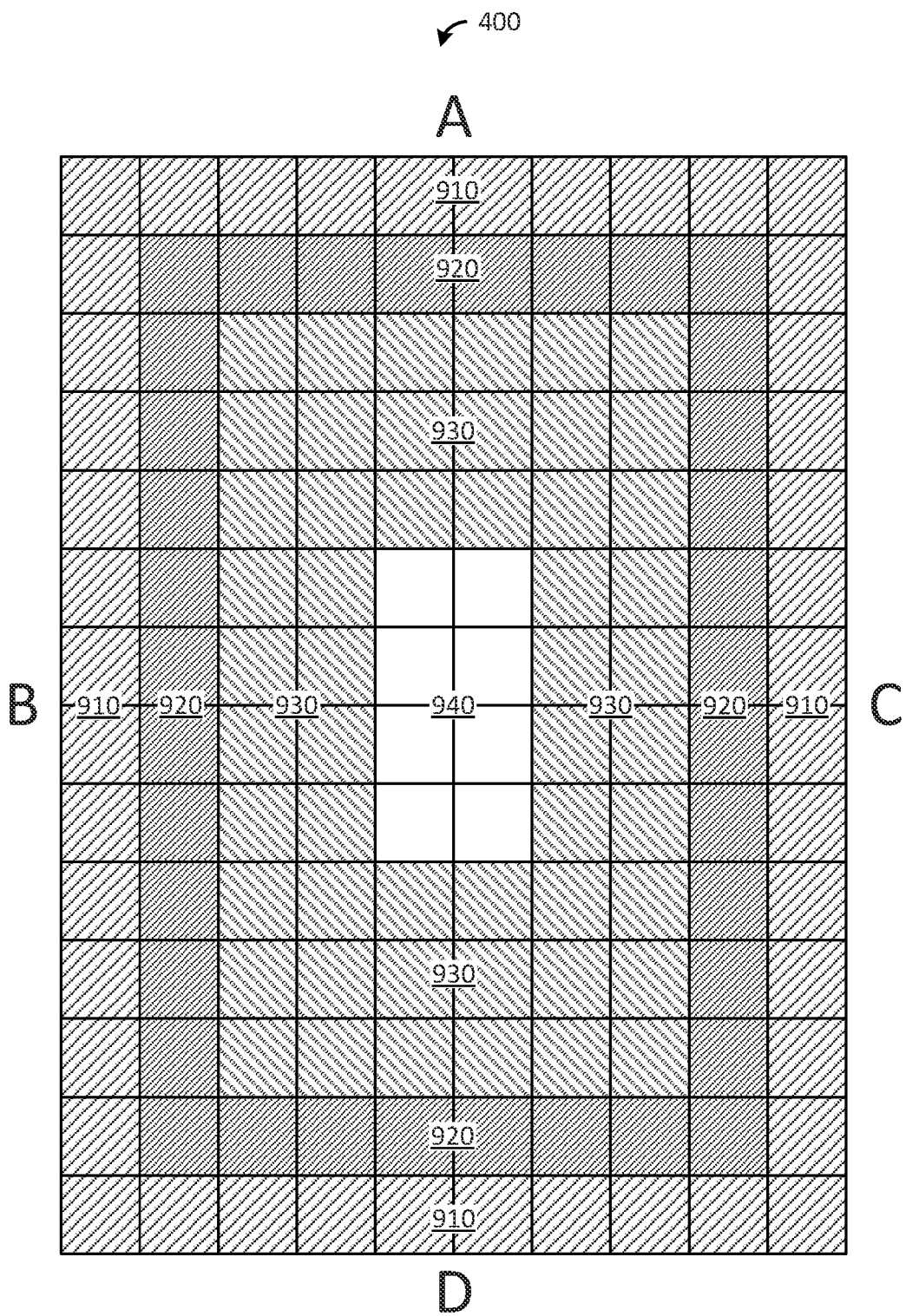
FIG. 9 illustrates an example of a pixelated sensing area partitioned into zones, in accordance with another embodiment.

FIG. 9 illustrates the pixelated sensing area 400 partitioned into four contiguous zones: a central zone 940 surrounded by zones 930, 920 and 910 at successively increasing distances from the central zone 940. In FIG. 9, each of the small squares in the sensing area 400 represents a pixel having a detector of the 2D detector array 132. The pixels of the central zone 940 are indicated as solid squares. The zone 930 is adjacent to the central zone, and the zone 920 is adjacent to zone 930, surrounding both the zones 930 and 940. Zone 910 surrounds all the other zones and extends to the edges A, B, C, and D of the sensing area 400. All pixels are assigned a numerical weight and all pixels of one zone are assigned the same weight. For example, all the pixels of the central zone 940 may be assigned a weight equal to zero. The weight of the pixels of each successive zone away from the central zone increases or remains the same. Accordingly, the zone 910, comprising pixels closest to the edges of the sensing area, are given the highest weight.

Figure 11A:
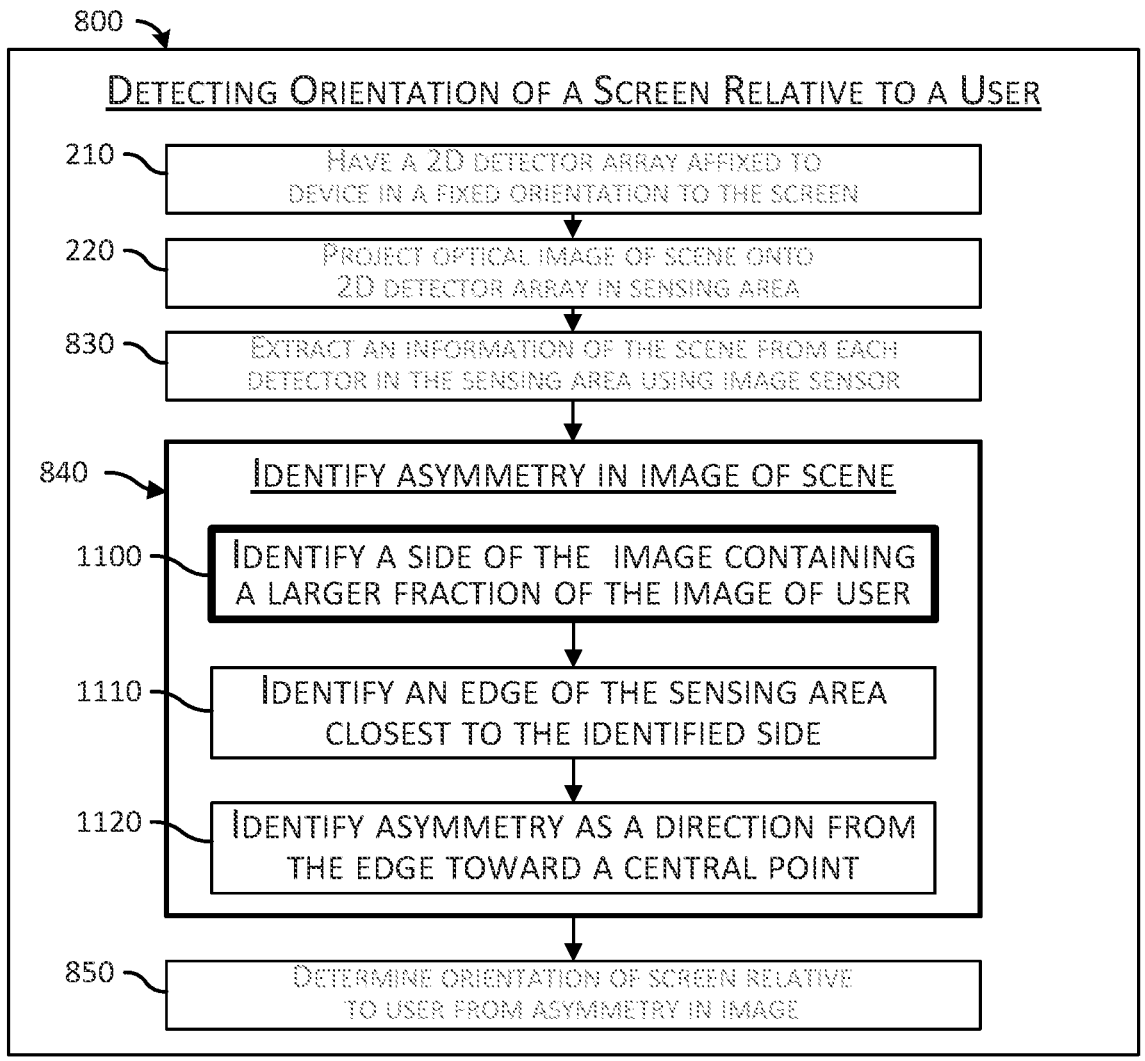
FIGS. 11A-11B illustrate details of the flow diagram illustrated in FIG. 8.

FIG. 11A illustrates a more detailed flow used in the execution of the block 840. As mentioned above, block 840 indicates identifying the asymmetry in the image of the scene 420. The more detailed flow for executing block 840 comprises three steps.

First, in block 1100, one of four sides of the image is identified as the side containing a larger fraction of the image of the user 422. Each side is associated with one edge of the sensing area and comprises all pixels in a segment between the associated edge and the central zone 940. For example, as illustrated in FIGS. 10A-10D, segment 1002 is associated with edge C, segment 1004 is associated with edge A, segment 1006 is associated with edge B, and segment 1008 is associated with edge D.

Figure 10A:
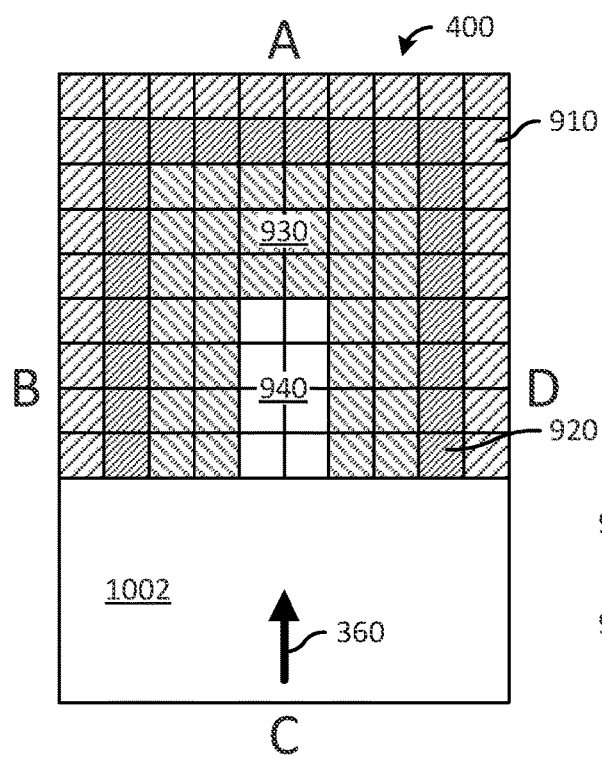
FIGS. 10A-10D illustrate an example of a method for detecting an orientation of an image of a user relative to a screen, in accordance with another embodiment.
Figure 10B:
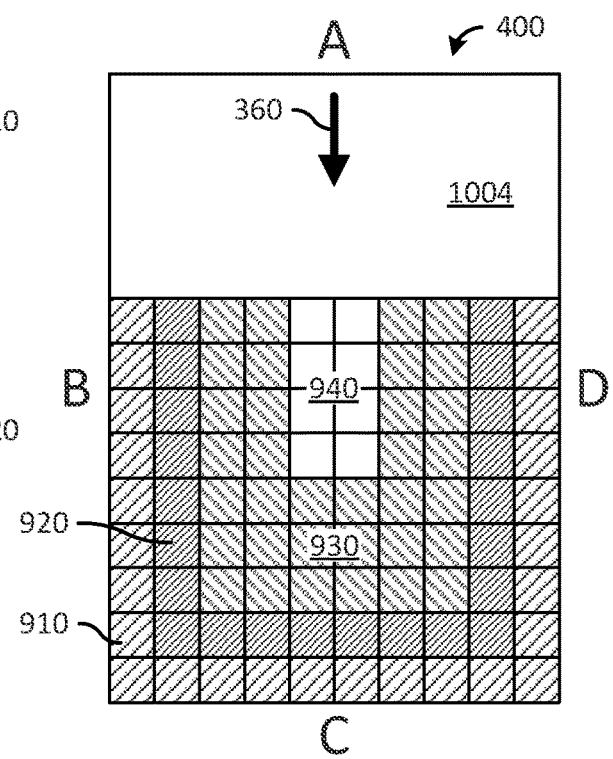
Figure 10C:
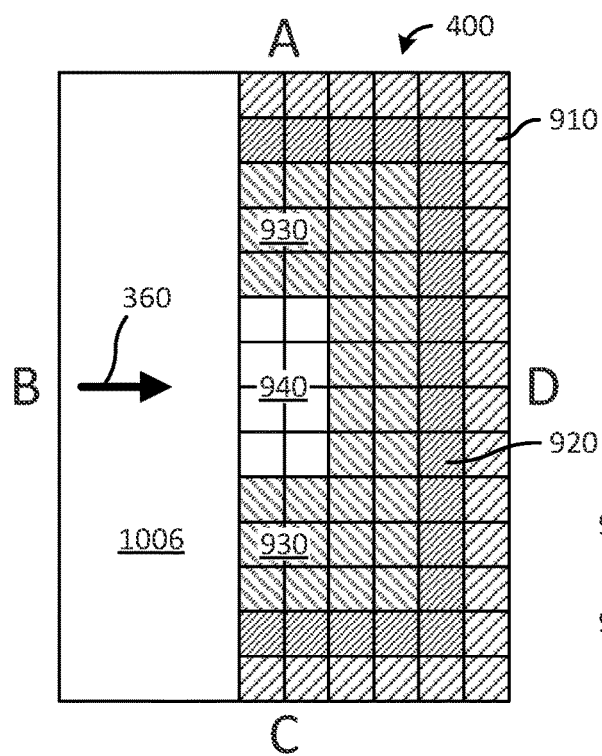
Figure 10D:
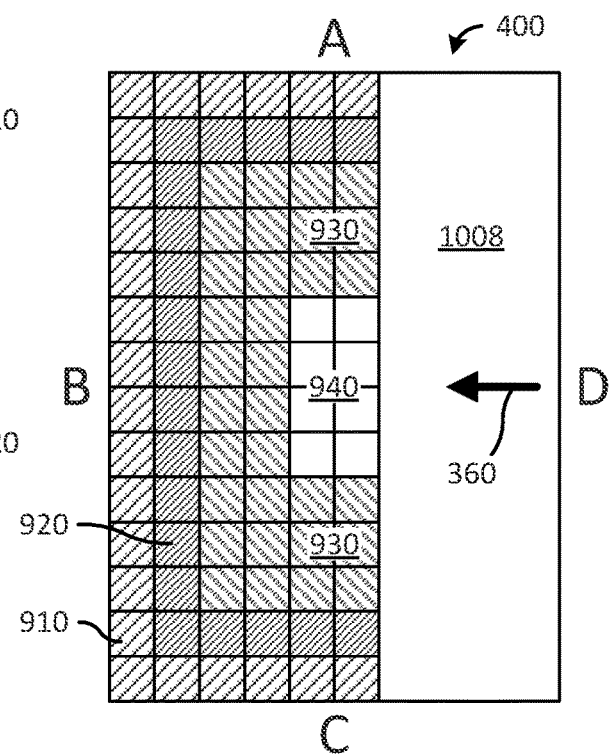
Figure 11B:
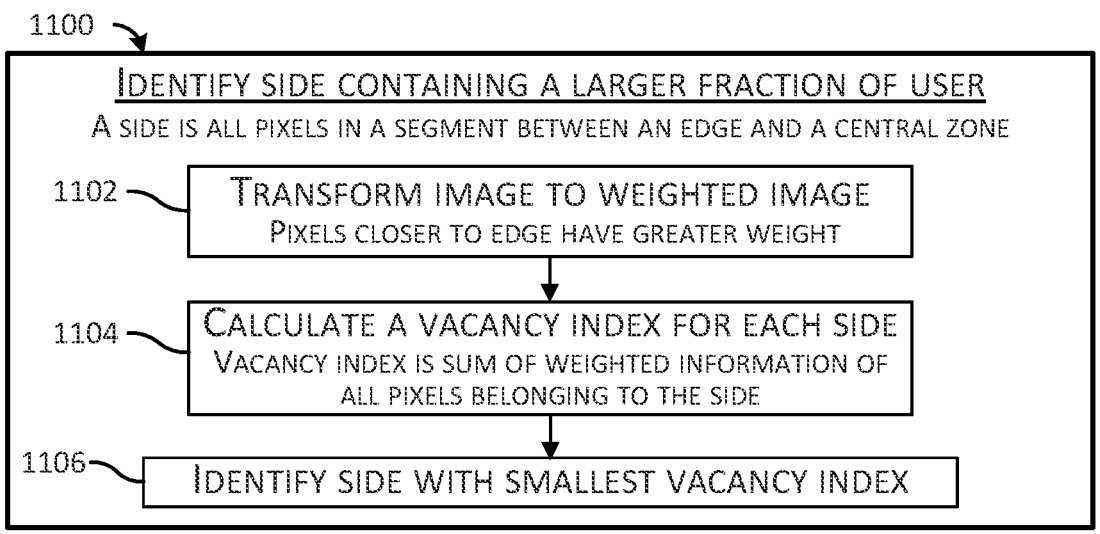

The execution of block 1100 is explained in the more detailed flow diagram in FIG. 11B with reference to FIGS. 10A-10D. As indicated in block 1102, the acquired image (e.g., a depth image, such as the images 430, 530, 630, and 730 in FIGS. 4A, 5A, 6A, and 7A, respectively) is transformed into a weighted image. For example, a depth image may be transformed to a weighted depth image by defining, for each pixel, a weighted depth equal to the product of the depth times the weight assigned for the respective pixel. It is noted that this transformation used in method 800 emphasizes the acquired information (e.g., the depth information) in pixels closer to the edges of the sensing area 400.

The weighted image is then processed by calculating a vacancy index for each of the four sides associated with the respective edges A, B, C, and D. The vacancy index for the side associated with one side is calculated from the weighted information of the pixels for the respective segment. For example, only the pixels in segment 1002, illustrated in FIG. 10A, may be used to calculate the vacancy index for the side associated with side C. Likewise, segment 1004, illustrated in FIG. 10B, is used for the side associated with side A, segment 1006, illustrated in FIG. 10C, is used for the side associated with side B, and segment 1008, illustrated in FIG. 10D, is used for the side associated with side D. In an embodiment where the weighted depth is the weighted information for pixels in the weighted image of the scene 420, the vacancy index for a side may be calculated as a sum of the weighted depths of all pixels in the respective segment, as indicated in block 1104 in FIG. 11B. The side having the smallest vacancy index may be identified as the side occupied by the larger fraction of the image of the user 422, as indicated in block 1106 in FIG. 11B.

Referring now to FIG. 11A, as indicated in block 1110, identifying the side with the larger fraction of the image of the user identifies the edge closest to that side. It is noted that this identified edge of the sensing area 400 is expected to be adjacent to the image of the torso of the user 422 because the image of the head of the user 422 is expected to be closer to the central zone 940 of the sensing area 400. Thus, as indicated in block 1120, a direction from the central part of the identified edge toward a central point of the image of the scene may define the identity of the asymmetry in the image of the user relative to the sensing area. This is indicated by the directions of the arrows 360 in FIGS. 10A-10D. In FIG. 10A the side associated with the edge C has been identified to have the largest fraction of the image of the user 422, thereby indicating an up orientation of the image of the user 422 relative to the sensing area 400. FIGS. 10B, 10C, and 10D, illustrate the cases where the identified sides are A, B, and D, respectively, indicating the respective orientations 360 (shown by the arrows) to be down, right, and left.

FIG. 12 illustrates a block diagram of an example of a system using a convolutional neural network (CNN) 1200 for detecting a screen orientation of a device relative to a user. In FIG. 12, a depth image, same as the depth image illustrated in FIG. 7, is being provided to a trained CNN 1200. As illustrated above in FIGS. 7A and 7B, the scene 420 comprising the user 422 has been imaged by the camera 412 of the device 410 to acquire a depth image comprising the depth image 730 of the user 422. The CNN 1200 may determine the orientation 360 of the image 730 of the user 422 relative to the sensing area 400. This information provides the orientation of the display screen of the device 410 relative to the user 422 and may be used to control the display screen to display the content in an orientation that is convenient for the user to view. The CNN 1200 may be using, for example, the algorithm used in method 800 for detecting the orientation of the image of the user relative to the sensing area. The numerical value of the weight assigned to a pixel of the sensing area according to the location of the pixel may have been refined during the training of the CNN with a large number of depth images along with the correct orientation for each image.

Example 1. A method for detecting an orientation of a screen of a device includes having a two-dimensional (2D) detector array affixed to the device in a fixed orientation relative to the screen, where the 2D detector array includes a sensing area with a plurality of pixels; imaging a scene including a user in a foreground and a background onto the 2D detector array; extracting an information of the scene for each of the plurality of pixels of the sensing area, the information being extracted from the 2D detector array by an image sensor; identifying an asymmetry in a pixelated image of the scene that includes the information of the scene for each of the plurality of pixels of the sensing area; and based on the asymmetry in the image of the scene, determining the orientation of the screen relative to the user.

Example 2. The method of example 1, where identifying the asymmetry and determining the orientation of the screen are performed by a pre-trained convolutional neural network (CNN).

Example 3. The method of one of examples 1 or 2 further includes rotating a display on the screen in accordance with the orientation.

Example 4. The method of one of examples 1 to 3 further includes, based on the pixelated image, identifying the asymmetry of an image of the scene with respect to a rotation of the image by 90°, 180°, and 270° about a central axis perpendicular to the sensing area.

Example 5. The method of one of examples 1 to 4, where identifying the asymmetry in an image of the scene includes: based on the pixelated image, identifying, from four edges of the sensing area, an edge proximate to a side of the image containing a larger fraction of the user in the scene, where the side of the image proximate to the edge includes the pixels located in an area between the edge and a central zone of the sensing area.

Example 6. The method of one of examples 1 to 5, where identifying the asymmetry in an image of the scene is determining the direction from a central point of the edge proximate to the side of the image containing a larger fraction of the user in the scene to a central point of the sensing area.

Example 7. The method of one of examples 1 to 6, where identifying the edge includes identifying the side containing a larger fraction of the user in the scene, where identifying the side includes: transforming the pixelated image to a weighted image, the weighted image includes a weighted information for each of the plurality of pixels, the weighted information for the pixel being the product of the information for the pixel times a weight assigned for the pixel; and based on the weighted image, identifying the side of the image containing a larger fraction of the user in the scene.

Example 8. The method of one of examples 1 to 7, where the weight for each of the plurality of pixels is assigned by a pre-trained convolutional neural network (CNN).

Example 9. The method of one of examples 1 to 8, where transforming the pixelated image includes: partitioning the pixels of the sensing area into contiguous zones surrounding a central zone at successively increasing distances from the central zone; and assigning all the pixels of each of the contiguous zones a weight, where the weight of the pixels of each successive zone of the contiguous zones away from the central zone increases or remains the same.

Example 10. The method of one of examples 1 to 9, where based on the weighted image, identifying the side of the image containing a larger fraction of the user in the scene includes: calculating a vacancy index for each of the plurality of pixels of the sensing area from the weighted information for the pixel; calculating a vacancy index for each side of the image, the vacancy index of the side being the sum of the vacancy indices for the pixels included in the side; and identifying the side having the smallest vacancy index to be the side of the image containing a larger fraction of the user in the scene.

Example 11. A method for detecting an orientation of a screen of a device, the method includes: having a two-dimensional (2D) detector array affixed to the device in a fixed orientation relative to the screen that includes a sensing area with a plurality of pixels; imaging a scene onto the 2D detector array, the scene including a user in a foreground and a background; acquiring a pixelated depth image of the scene, the pixelated depth image including a depth of the scene for each of the plurality of pixels of the sensing area, the depth being extracted from the 2D detector array by a depth image sensor; based on a reflection symmetry of the pixelated depth image of the scene across a plurality of horizontal lines and a plurality of vertical lines spanning the sensing area, finding a first axis of reflection as the line across which the pixelated depth image of the scene is substantially symmetric; defining a second axis perpendicular to the first axis, the second axis passing through a central point of the sensing area; based on an asymmetry in the image of the scene for reflection across the second axis, determining the orientation of the image of the user along the first axis of reflection; and based on the orientation of the image of the user, determining the orientation of the screen relative to the user.

Example 12. The method of example ii, where finding the first axis of reflection includes: for each line of the plurality of horizontal and vertical lines, generating a measure of reflection symmetry of the pixelated depth image across the line; and finding the first axis as the line from the plurality of horizontal and vertical lines with the highest measure of reflection symmetry.

Example 13. The method of one of examples 11 or 12, where finding the first axis; defining the second axis, based on an asymmetry in the image of the scene across the second axis; determining the orientation of the image of the user along the first axis; and determining the orientation of the screen relative to the user based on the orientation of the image of the user; are performed by a pre-trained convolutional neural network (CNN).

Example 14. The method of one of examples 11 to 13 further includes rotating a display on the screen in accordance with the orientation.

Example 15. The method of one of examples 11 to 14 further includes identifying the image of the user in the pixelated depth image of the scene by selecting each pixel for which the depth is less than a pre-determined maximum depth.

Example 16. The method of one of examples 11 to 15, where determining the orientation of the image of the user along a first axis of reflection includes: defining two central axes of the image of the user including one horizontal line and one vertical line passing through a central point of the image of the user; between the two central axes of the image of the user, finding a first axis of reflection as the line across which the pixelated depth image of the user is substantially symmetric; defining a second axis as the central axis perpendicular to the first axis; and based on an asymmetry in the image of the user for reflection across the second axis, determining the orientation of the image of the user along the first axis of reflection.

Example 17. A mobile device including: a screen; a camera including: an illuminator configured to illuminate a scene in its field of view; an imaging system configured to project an optical image of the scene onto a two-dimensional (2D) detector array affixed to the device in a fixed orientation relative to the screen, the 2D detector array including a sensing area with a plurality of pixels; and an image sensor configured to extract a pixelated image of the scene from the 2D detector array, the pixelated image including an information of the scene for each of the plurality of pixels of the sensing area; a processor; a memory; and a program including an instruction stored in the memory, where the program is coded with an instruction which, when executed by the processor causes the processor to: identify an asymmetry of a pixelated image of the scene, the pixelated image including the information of the scene for each of the plurality of pixels of the sensing area; and based on the asymmetry of the image of the scene, determine the orientation of the screen relative to a user.

Example 18. The device of example 17, where the camera is a light detection and ranging system (LIDAR).

Example 19. The device of one of examples 17 or 18, where the LIDAR is a time-of-flight (TOF) camera.

Example 20. The device of one of examples 17 to 19 further includes a pre-trained convolutional neural network (CNN).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for detecting an orientation of a screen of a device, the method comprising:
   having a two-dimensional (2D) detector array affixed to the device in a fixed orientation relative to the screen, the 2D detector array comprising a sensing area with a plurality of pixels;
   imaging a scene onto the 2D detector array, the scene comprising a user in a foreground and a background;

extracting an information of the scene for each of the plurality of pixels of the sensing area, the information being extracted from the 2D detector array by an image sensor;

identifying an asymmetry in a pixelated image of the scene, the pixelated image comprising the information of the scene for each of the plurality of pixels of the sensing area; and based on the asymmetry in the image of the scene, determining the orientation of the screen relative to the user.

2. The method of claim 1, wherein the identifying the asymmetry and determining the orientation of the screen are performed by a pre-trained convolutional neural network (CNN).

3. The method of claim 1, further comprising rotating a display on the screen in accordance with the orientation.

4. The method of claim 1, further comprising based on the pixelated image, identifying the asymmetry of an image of the scene with respect to a rotation of the image by 90°, 180°, and 270° about a central axis perpendicular to the sensing area.

5. The method of claim 1, wherein identifying the asymmetry in an image of the scene comprises: based on the pixelated image, identifying, from four edges of the sensing area, an edge proximate to a side of the image containing a larger fraction of the user in the scene, wherein the side of the image proximate to the edge comprises the pixels located in an area between the edge and a central zone of the sensing area.

6. The method of claim 5, wherein identifying the asymmetry in an image of the scene is determining the direction from a central point of the edge proximate to the side of the image containing a larger fraction of the user in the scene to a central point of the sensing area.

7. The method of claim 5, wherein identifying the edge comprises identifying the side containing a larger fraction of the user in the scene, wherein identifying the side comprises:

transforming the pixelated image to a weighted image, the weighted image comprising a weighted information for each of the plurality of pixels, the weighted information for the pixel being the product of the information for the pixel times a weight assigned for the pixel; and based on the weighted image, identifying the side of the image containing a larger fraction of the user in the scene.

8. The method of claim 7, wherein the weight for each of the plurality of pixels is assigned by a pre-trained convolutional neural network (CNN).

9. The method of claim 7, wherein transforming the pixelated image comprises:

partitioning the pixels of the sensing area into contiguous zones surrounding a central zone at successively increasing distances from the central zone; and assigning all the pixels of each of the contiguous zones a weight, wherein the weight of the pixels of each successive zone of the contiguous zones away from the central zone increases or remains the same.

10. The method of claim 7, wherein based on the weighted image, identifying the side of the image containing a larger fraction of the user in the scene comprises:

calculating a vacancy index for each of the plurality of pixels of the sensing area from the weighted information for the pixel;

calculating a vacancy index for each side of the image, the vacancy index of the side being the sum of the vacancy indices for the pixels included in the side; and identifying the side having the smallest vacancy index to be the side of the image containing a larger fraction of the user in the scene.

11. A method for detecting an orientation of a screen of a device, the method comprising:

having a two-dimensional (2D) detector array affixed to the device in a fixed orientation relative to the screen, the 2D detector array comprising a sensing area with a plurality of pixels;

imaging a scene onto the 2D detector array, the scene comprising a user in a foreground and a background;

acquiring a pixelated depth image of the scene, the pixelated depth image comprising a depth of the scene for each of the plurality of pixels of the sensing area, the depth being extracted from the 2D detector array by a depth image sensor;

based on a reflection symmetry of the pixelated depth image of the scene across a plurality of horizontal lines and a plurality of vertical lines spanning the sensing area, finding a first axis of reflection as the line across which the pixelated depth image of the scene is substantially symmetric;

defining a second axis perpendicular to the first axis, the second axis passing through a central point of the sensing area;

based on an asymmetry in the image of the scene for reflection across the second axis, determining the orientation of the image of the user along the first axis of reflection; and based on the orientation of the image of the user, determining the orientation of the screen relative to the user.

12. The method of claim 11, wherein finding the first axis of reflection comprises:

for each line of the plurality of horizontal and vertical lines, generating a measure of reflection symmetry of the pixelated depth image across the line; and finding the first axis as the line from the plurality of horizontal and vertical lines with the highest measure of reflection symmetry.

13. The method of claim 11, wherein the finding the first axis, defining the second axis, based on an asymmetry in the image of the scene across the second axis, determining the orientation of the image of the user along the first axis, and based on the orientation of the image of the user, determining the orientation of the screen relative to the user are performed by a pre-trained convolutional neural network (CNN).

14. The method of claim 11, further comprising rotating a display on the screen in accordance with the orientation.

15. The method of claim 11, further comprising identifying the image of the user in the pixelated depth image of the scene by selecting each pixel for which the depth is less than a pre-determined maximum depth.

16. The method of claim 15, wherein determining the orientation of the image of the user along a first axis of reflection comprises:

defining two central axes of the image of the user comprising one horizontal line and one vertical line passing through a central point of the image of the user;

between the two central axes of the image of the user, finding a first axis of reflection as the line across which the pixelated depth image of the user is substantially symmetric;

defining a second axis as the central axis perpendicular to the first axis; and based on an asymmetry in the image of the user for reflection across the second axis, determining the orientation of the image of the user along the first axis of reflection.

17. A mobile device comprising:
a screen;
a camera comprising:
  an illuminator configured to illuminate a scene in its field of view;
  an imaging system configured to project an optical image of the scene onto a two-dimensional (2D) detector array affixed to the device in a fixed orientation relative to the screen, the 2D detector array comprising a sensing area with a plurality of pixels; and
  an image sensor configured to extract a pixelated image of the scene from the 2D detector array, the pixelated image comprising an information of the scene for each of the plurality of pixels of the sensing area;
a processor;
a memory; and
a program comprising an instruction stored in the memory, wherein the program is coded with an instruction which, when executed by the processor causes the processor to:
  identify an asymmetry of the pixelated image of the scene; and
  based on the asymmetry of the image of the scene, determine the orientation of the screen relative to a user.

18. The device of claim 17, wherein the camera is a light detection and ranging system (LIDAR).

19. The device of claim 18, wherein the LIDAR is a time-of-flight (TOF) camera.

20. The device of claim 17, further comprising a pre-trained convolutional neural network (CNN).

* * * * *